Figure 1:
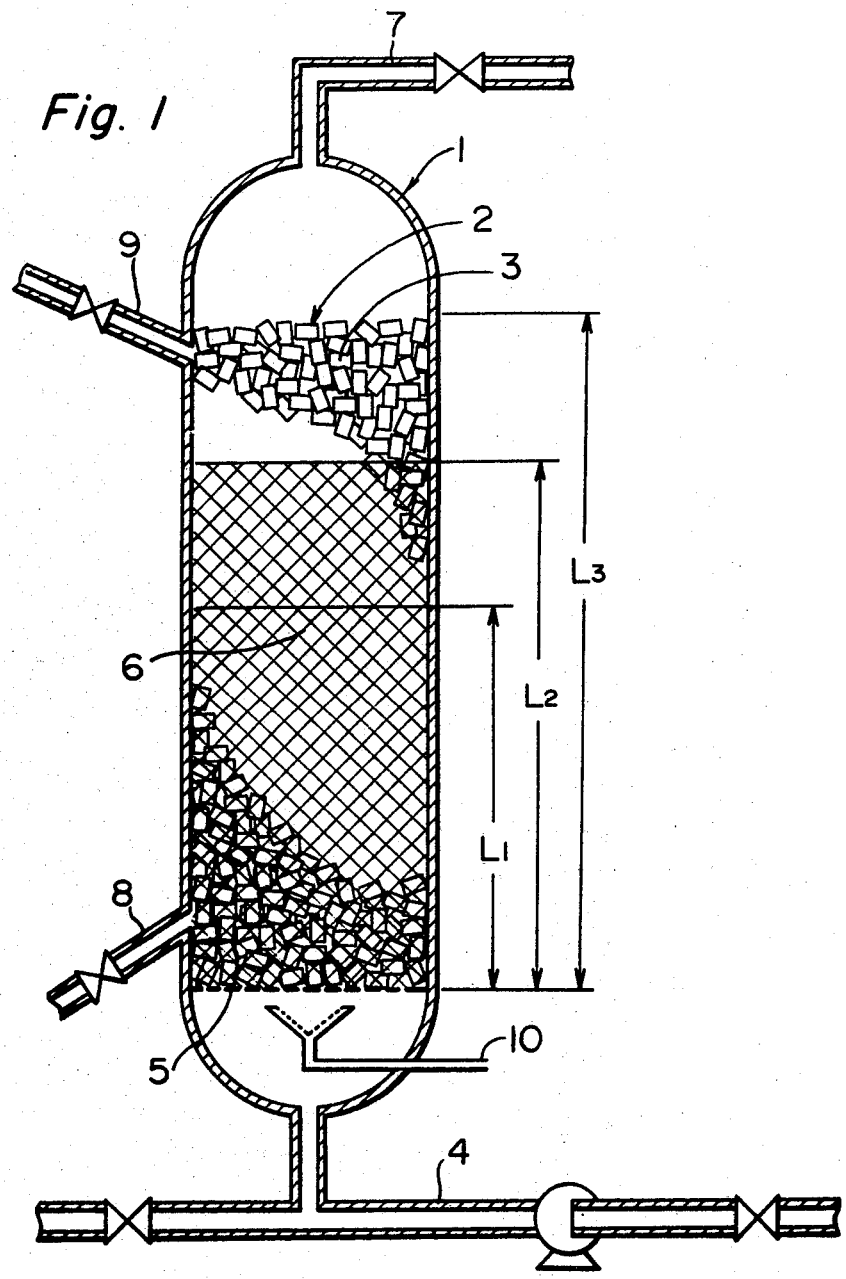

United States Patent

Mohri et al.

[11] 4,137,162
[45] Jan. 30, 1979

[54] METHOD FOR TREATING WASTE WATERS

[75] Inventors: Michihiro Mohri; Hiroo Takeda; Masaaki Tsunemi, all of Kawasaki; Tadashi Uchiumi, Tokyo; Takeshi Kanda, Sagamihara, all of Japan

[73] Assignee: Nippon Oil Company, Ltd., Tokyo, Japan

[21] Appl. No.: 830,782

[22] Filed: Sep. 6, 1977

[30] Foreign Application Priority Data

Sep. 10, 1976 [JP] Japan .................... 51-107721

[51] Int. Cl.$^2$ .................... B01D 15/00; C02B 1/14
[52] U.S. Cl. .................... 210/40; 210/73 W
[58] Field of Search .............. 210/24, 39, 63 R, 73 W, 210/80, 81, 189, 269, 274, 290, 359, 502, 503; 23/288 S; 34/22 R, 33; 55/74, 77, 79, 91, 99, 387, 390; 261/94

[56] References Cited

U.S. PATENT DOCUMENTS

| 2,448,135 | 8/1948 | Becker | 55/99 x |
| 2,533,026 | 12/1950 | Matheson | 23/288 S |
| 2,602,019 | 7/1952 | Odell | 23/288 S |
| 4,012,210 | 3/1977 | Morris | 55/99 |

Primary Examiner—Ferris H. Lander
Attorney, Agent, or Firm—Sherman & Shalloway

[57] ABSTRACT

A method for treating waste waters to remove oils and/or COD therefrom, which comprises accomodating solid porous packing pieces and activated carbon particles in a container, the porous packing pieces forming a stationary porous packed bed, the average pore diameter of the porous packing pieces being 1.5 to 8 times the average diameter of the activated carbon particles; introducing a waste water, if desired, together with an oxygen-containing gas and/or an oxidizing gas, from the bottom portion of the container to fluidize the activated carbon particles within the pores of the porous packing pieces and in spaces among the adjoining porous packing pieces and simultaneously to contact the waste water with the activated carbon particles; maintaining the upper level of the fluidized bed of the activated carbon particles at least 5 cm below the upper level of the porous packed bed; and withdrawing the waste water which has been so contacted from the top portion of the container.

10 Claims, 1 Drawing Figure

METHOD FOR TREATING WASTE WATERS

This invention relates to a method for treating waste waters to remove oils and COD therefrom.

The tremendous advance of the heavy chemical industry in recent years has caused the discharge of enormous amounts of waste waters, and a number of methods exemplified below have been suggested for treating them to remove oils and COD therefrom.

For example, methods for removing oils by a process involving separation by standing or a separator process are effective as pre-treatment, but are not feasible for removing the oils completely. Methods involving the addition of various salts and flocculating agents have defects associated with the use of these chemicals, and consideration must be given to secondary pollution. The activated sludge process utilizing the assimilating ability of microorganisms for removing oils and COD has the defect that the operation is difficult to control, and the excess sludge must be treated additionally.

Methods using various filters and coalescers have also been suggested, but are not sufficiently effective for the treatment of small-diameter oil droplets and oil droplets forming an emulsion.

Methods, utilizing various adsorbents are free from these defects, and can more exactly remove small-diameter and emulsion droplets and COD. However, the adsorbing capacity of the adsorbents is limited, and the adsorbents must be regenerated with considerable frequency. When an adsorbent is used as a fixed packed bed, the passing of waste water must be interrupted at the time of regeneration, and this method involves the trouble of taking out activated carbon from the packed bed for regeneration.

On the other hand, methods have also been suggested to use the particles of an adsorbent as a fluidized bed in order to perform adsorption and regeneration continuously. When an ordinary fluidized bed is used, the packing density of the particles in it often decreases, and sufficient contact cannot be obtained easily. Moreover, sufficient care must be taken about the escaping of the adsorbent particles from the contacting vessel. To increase the efficiency of adsorption by closer contact, the adsorbent particles are preferably as small as possible. However, this leads to the inconvenience that with smaller particle diameter, the escaping of the particles becomes more vigorous. When sulfur compounds are present in the waste water, anaerobic microorganisms occur on the surface of the adsorbent during the contact of the waste water with the adsorbent. These microorganisms reduce the sulfur compounds to form hydrogen sulfide or colloidal sulfur with the result that the waste water to be treated smells bad or becomes turbid. It is known to introduce an oxygen-containing gas such as air together with the waste water at the time of contact in order to prevent this problem. If, however, such a gaseous material is introduced into the fluidized bed, the escaping of the adsorbent particles from the contacting vessel becomes more vigorous, and consequently, the adsorbent may move from the contacting vessel to various devices downstream of it, and clog them.

We have made investigations to remove these defects, and found that waste waters can be treated with a very good treating effect by using under specified conditions the fluidized bed reactor including a porous packing which was suggested by us in U.S. Ser. No. 521,030 filed Nov. 5, 1974 and now abandoned. (German Patent Application No. P 2452936.0 filed Nov. 7, 1974).

The present invention provides a method for treating waste waters to remove oils and/or COD therefrom, which comprises accomodating solid porous packing pieces and activated carbon particles in a container, the porous packing pieces forming a stationary porous packed bed, the average pore diameter of the porous packing pieces being 1.5 to 8 times the average diameter of the activated carbon particles; introducing a waste water and if desired an oxygen-containing gas and/or an oxidizing gas from the bottom portion of the container to fluidize the activated carbon particles within the pores of the porous packing pieces and in spaces among the adjoining porous packing pieces and simultaneously to contact the waste water with the activated carbon particles; maintaining the upper level of the fluidized bed of the activated carbon particles at least 5 cm below the upper level of the porous packed bed; and withdrawing waste water which has been so contacted from the top portion of the container.

In the method of this invention, it is preferred to introduce an oxygen-containing gas such as air and/or an oxidizing gas such as ozone together with the waste water from the bottom portion of the container. An especially superior effect of treating the waste water can be obtained by adjusting the linear velocity of the waste water to 0.1 to 6 cm/sec., the liquid space velocity (vol waste water/vol activated carbon/sec) to 2 to 40 l/sec. and the linear velocity of air to 0.1 to 4 cm/sec in the container.

The accompanying drawing shows one embodiment of an apparatus used for the method of this invention.

The method of this invention will be described in more detail below.

The waste water to be treated by the method of this invention consists of fresh water or sea water and various kinds of unused or used oils and/or COD in it. The oils are usually mineral oils from gasoline fractions to heavy oils, or edible oils, and may be in very fine droplets (for example, not more than 10 microns), or emulsion droplets. Specific examples of the waste water are bilge water (foul water that collects in the bilge of a ship, for example, in an engine room), ballast water, waste waters containing lubricating oils which are discharged from various machine factories, waste waters from various petroleum oil refineries or oil tanks, and various other waste waters whose COD is detectable.

The shape of the contacting container used in this invention is not particularly restricted, but a vertically elongated cylindrical container with both ends adapted to be sealed is preferably used.

The porous packing pieces and activated carbon particles are accomodated in this container.

The shape of each porous packing piece used in this invention may be any desired one, such as a cylindrical, ring-like, net-like, coil-like or star-like shape. The material for the porous packing may be any suitable material to be chosen according to the contacting conditions. Examples of the material are refractory inorganic substances such as metals, porcelain clay, silica, alumina or magnesia, and polymeric compounds such as polyethylene, polypropylene, polyvinyl chloride or polytetrafluoroethylene.

The size of each packing piece is usually about 3 to 40 mm. The porous packing piece has at least one pore having an average pore diameter 1.5 to 8 times, preferably 2 to 5 times, the average particle diameter of the activated carbon particles. If the average pore diameter of the packing piece is less than 1.5 times, it is difficult for the solid particles to move freely through the pores of the porous packing, and it is impossible to maintain a uniform fluidized state of the solid particles within the contacting container and the porous packed layer at the top portion of the contacting container. If the size is more than 8 times, the action of the porous packing to control the motion of the solid particles is reduced, and the fluidized state desired in the present invention cannot be achieved. Consequently, the flowing of the solid particles out of the contacting container cannot be prevented.

The term "average pore diameter of a porous packing", as used in the present specification and claims, is a measure of the size of the pores of the porous packing piece, and is defined as the diameter of a circle which has an area equal to an average area of the pores of the porous packing. Where the porous packing is a Raschig ring made of a porous sheet, the average area of the pores should be calculated only on the basis of the areas of the pores provided on the porous sheet as a material, and the areas of the top and bottom holes of the cylindrical ring should be excluded in this calculation. Likewise, when the porous packing is made of a net, the average area of the pores should be calculated only from the areas of the meshes of the net. When the porous packing used in this invention is a coily packing, the distance between lines forming the coil is regarded as a pore of the porous packing, and the distance is defined as an average diameter of the porous packing.

The porous packing is accomodated in the container to form a stationary packed layer. At this time, it is preferred to use such a packed state that the ratio of the superficial volume occupied by the porous packing bed to the real volume of the porous packing it at least 1.5.

The term "real volume of a porous packing", as used in the present specification and claims, denotes the volume which is occupied only by the substance of the porous packing. The term "superficial volume occupied by a porous packing bed" denotes the volume which the porous packing bed formed by the packing of the porous packing occupies in space, which is equal to the total sum of the bulk volume of the entire packing and the volume of the spaces among the packing pieces.

If this ratio is less than 1.5, the movement of the activated carbon particles becomes unstable, and it is impossible to maintain the particles in a suitably fluidized state. Moreover the real volume of the porous packing in the porous packing bed increases so much that the effective contacting space becomes too small. If the porous packing is made of a wire gauze, the ratio of the superficial volume occupied by the porous packing bed to the real volume of the porous packing can be very high, and good contact can be maintained even if it is more than 100. However, from the viewpoint of the strength of the metallic material, this ratio is preferably not more than 100. If the porous packing is made of a refractory material such as porcelain clay or a polymeric compound, the ratio is desirably not more than 50 from the standpoint of strength.

The activated carbon particles used in this invention usually have a particle diameter of 0.1 to 8 mm, and preferably 0.3 to 3 mm. Desirably, they are of spherical shape, but it is also possible to use crushed activated carbon having a relatively uniform particle diameter. Preferably, the activated carbon has a relatively high strength and a high ability to adsorb oils. However, as described hereinbelow, the used activated carbon can be continuously replaced by fresh one in the present invention. Hence, the activated carbon actually used need not have a particularly high adsorbing ability.

The waste water is supplied from the bottom portion of the contacting container having the porous packing and the activated carbon particles accomodated in the manner described. Preferably, the supply of the waste water is performed through a distributor provided at the bottom portion of the container.

The supply of the waste water causes a fluidizing motion of the activated carbon particles. The waste water is fed into the container at a speed higher than the speed at which the activated carbon particles begin to be fluidized. The activated carbon particles make a fluidizing motion in the pores of the porous packing and the spaces among the porous packing pieces. As a result of fluidization, the activated carbon particles form an activated carbon particle layer which is larger in volume than the initially packed condition. The upper level of the activated carbon particles layer should be maintained at least 5 cm, preferably 10 to 20 cm, below the upper level of the porous packed bed. If the upper level of the fluidized activated carbon layer approaches the upper level of the porous packed bed by a distance within 5 cm, or especially when the activated carbon layer is situated above the porous packed bed, the activated carbon particles undesirably fly out of the contacting container.

Such a contacting conditions can be obtained by introducing the waste water such that the linear velocity of the waste water in the contacting container is 0.1 to 6 cm/sec. preferably 0.2 to 1.5 cm/sec, as a superficial linear velocity in a column. The liquid space velocity is usually 2 to 40 (vol waste water/vol activated carbon/sec), preferably about 4 to 20, 1/sec.

In order to prevent the occurrence of anaerobic microorganisms, it is preferred to introduce an oxygen-containing gas such as air from the bottom portion of the container together with the waste water either continuously or intermittently. The oxygen-containing gas is introduced at a linear velocity of 0.1 to 4 cm/se, preferably 0.3 to 1.0 cm/sec, as a superficial linear velocity in a column.

The oxygen-containing gas introduced becomes bubbles, and rises through the container. Since the presence of the porous packed bed makes the bubbles fine, the contacting is performed more closely, and the amount of activated carbon particles which are entrained by the interfaces of the bubbles and fly out of the container is very small.

In the present invention, an oxidizing gas such as ozone gas can also be introduced in addition to the oxygen-containing gas to further reduce COD of the waste water.

The temperature used for the treatment method of this invention is not restricted in particular. Usually, is is 0 to 80° C, and temperatures of 5 to 40° C are preferred. The pressure is neither restricted in particular. But for the operation of the apparatus, somewhat elevated pressures of 1 to 20 kg/cm$^2$·G, preferably 2 to 5 kg/cm$^2$·G, are advantageous.

One preferred embodiment of the present invention is described below by reference to the accompanying drawing (FIG. 1). Porous packing pieces 2 are packed in a contacting container 1 of a cylindrical shape to form a porous packed bed 3. The packing pieces 2 used at this time should be porous. For example, a porous plate having many pores provided therein, or a net having meshes of suitable sizes is formed into small pieces of a suitable shape, and such small pieces are used as the porous packing in accordance with this invention. A porous Raschig ring is one preferred example of the porous packing piece used in this invention. The porous packing pieces 2 are packed in a uniform density in the porous packed bed 3. A support plate (wire gauze) 5 for the porous packing pieces 2 is provided at the bottom portion of the contacting container, and the porous packing bed having a height $L_3$ is formed thereon. In this case, the support plate 5 may be provided at a suitable height from the bottom whereby the porous packed bed is present only at the upper portion of the container, but not in the lower portion although the activated carbon particles are present also in the lower portion of the container. The activated carbon particles are then placed in the contacting container. $L_1$ shown in FIG. 1 represents the height of the activated carbon particle layer when it is allowed to stand. The waste water is introduced into the contacting container 1 from a pipe 4, and enters a contacting zone 6 containing the activated carbon particles through the distributor plate 5. The activated carbon particles are fluidized by the flow of the oil-containing waste water, and consequently, the layer of the activated carbon layer is expanded. $L_2$ in FIG. 1 shows the height of the fluidized bed of the activated particles. When the method of this invention is compared with the fluidization of activated carbon particles in a fluidized bed not containing a porous packing, it is seen that the ratio of expansion of the activated carbon particles can be maintained extremely low. Hence, a fluidized bed of higher density can be formed whereby more close contacting is performed and the popping out of the activated carbon particles can be completely prevented. The waste water which has been contacted within the container 6 goes out of the contacting container from a pipe 7. When the activated carbon particles are deteriorated, they are withdrawn continuously or intermittently without stopping the operation of the apparatus through a pipe 8, and fresh activated carbon particles are introduced from a pipe 9. At this time, the introduction and withdrawal of the activated carbon particles can be performed without changing the flowing speed of the waste water, and this operation scarcely changed the flowing conditions.

The activated carbon so withdrawn can be regenerated outside the system by an ordinary method, and reused.

Air is introduced from a pipe 10 to prevent the occurrence of anaerobic microorganisms. An oxidizing gas such as ozone can also be introduced.

The effective treatment of waste water by the method of this invention is performed by supplying a waste water preferably having a COD of 10 to 100 ppm and an oil content of 2 to 50 ppm, more preferably a COD of 15 to 50 ppm and an oil content of 10 to 5 ppm and contacting it so as to obtain purified water having a COD of less than 10 ppm and an oil content of less than 1 ppm. By operating the apparatus under such conditions, the treatment of waste water by the method of this invention can be effectively performed stably for long periods of time.

The following Examples show the results of experiments wherein the present invention was applied to the treatment of waste waters from an oil refinery.

EXAMPLE 1

Porous packing pieces (25 liters) were placed into a contacting container having a diameter of 11.4 cm and a height of 250 cm. Each porous packing piece was made of a wire gauze of stainless steel (SUS 27), and had a diameter of 10 mm and a height of 10 mm. Each mesh of the wire gauze measured 1.5 by 15 mm, and the diameter of the wire was 0.42 mm.

Spherical activated carbon was used as an adsorbent. The activated carbon had an average diameter of 0.4 mm, a true density of 2.05 and an apparent density of 0.55. It was fed into the contacting container in an amount of 14 liters.

A petroleum oil refinery waste water having a COD of about 30 ppm and an oil content, as measured by the n-hexane method, of about 6 ppm was introduced from the bottom portion of the contacting container at a linear velocity of 1.0 cm/sec. The upper level of the fluidized bed of the activated carbon was 10 cm below the upper level of the porous packed bed. The treated water discharged from the top of the container had a COD of about 3 ppm and an oil content, measured by the n-hexane method, of about 0.8 ppm. The spherical activated carbon exhibited a very uniform fluidized condition, and no popping out of the carbon particles was observed.

EXAMPLE 2

It is known that when a water-treating apparatus including activated carbon is used, the inclusion of sulfur compounds in the waste water to be treated causes the growth of anaerobic microorganisms during long-term use, and the microorganisms reduce the sulfur compounds to form $H_2S$ or collodial sulfur which in turn imparts offensive odors to the treated water or renders it turbid.

When a waste water having the same characteristics and condition as that used in Example 1 was passed through the contacting container for 2 weeks, the treated water had a smell of $H_2S$ and was turbid. This shows that anaerobic microorganisms occurred on the spherical activated carbon.

EXAMPLE 3

A waste water having the same condition and characteristics as in Example 2 was passed through the contacting container for 4 weeks. To prevent the occurrence of anaerobic microorganisms on the activated carbon, air was continuously introduced at a rate of 100 liters/hr from the bottom of the contacting container. After the end of the 4-week period, no odor or turbidity of the treated water was noted. This clearly shows that the occurrence of anaerobic microorganisms was inhibited by the introduction of air. In addition, despite the introduction of air, none of the spherical activated carbon particles were seen to fly out of the container. It was ascertained that the air bubbles were dispersed as very fine bubbles.

EXAMPLE 4

A method for purifying waste water by removing COD therein by oxidation with ozone is known. This Example shows an example in which adsorption by activated carbon and oxidation with ozone were combined to treat waste waters.

Twenty-five liters of Pall rings having a height of 15 mm and a diameter of 15 mm were packed into a contacting container having an inside diameter of 11.4 cm and a height of 250 cm, and 12 liters of spherical activated carbon having an average diameter of 0.7 mm, a true density of 2.10 and an apparent density of 0.50 was packed as an adsorbent.

A petroleum oil refinery waste water having a COD of about 26 ppm and an oil content, measured by the n-hexane method, of about 7 ppm was introduced at a linear velocity of 0.8 cm/sec from the bottom portion of the contacting container. The upper level of the fluidized bed of activated carbon was about 15 cm below the upper level of the porous packed bed. The treated water discharged from the top portion had a COD of about 5 ppm and an oil content, as measured by the n-hexane method, of about 1.4 ppm.

While continuously passing the waste water in this condition, 90 liters of air containing 10% of ozone was continuously introduced from the bottom portion of the contacting container. The treated water discharged had a COD of about 3 ppm, and an oil content of 1.0 ppm.

What we claim is:

1. A method for treating waste waters to remove oils and/or COD therefrom, which comprises accomodating solid porous packing pieces and activated carbon particles in a container, the porous packing pieces forming a stationary porous packed bed, the average pore diameter of the porous packing pieces being 1.5 to 8 times the average diameter of the activated carbon particles; introducing a waste water from the bottom portion of the container to fluidize the activated carbon particles within the pores of the porous packing pieces and in spaces among the adjoining porous packing pieces and simultaneously to contact the waste water with the activated carbon particles; maintaining the upper level of the fluidized bed of the activated carbon particles at least 5 cm below the upper level of the porous packed bed; and withdrawing the waste water which has been so contacted from the top portion of the container.

2. A method for treating waste waters to remove oils and/or COD therefrom, which comprises accomodating solid porous packing pieces and activated carbon particles in a container, the porous packing pieces forming a stationary porous packed bed, the average pore diameter of the porous packing pieces being 1.5 to 8 times the average diameter of the activated carbon particles; introducing a waste water and at least one gas selected from the group consisting of an oxygen-containing gas and an oxidizing gas from the bottom portion of the container to fluidize the activated carbon particles within the pores of the porous packing pieces and in spaces among the adjoining porous packing pieces; contacting the waste water, said gas and activated carbon with one another while maintaining the linear velocity of the waste water at 0.1 to 6 cm/sec, the liquid space velocity (vol waste water/vol activated carbon/sec) at 2 to 40, and the linear velocity of said gas at 0.1 to 4 cm/sec in the container; maintaining the upper level of the fluidized bed of the activated carbon particles at least 5 cm below the upper level of the porous packed bed; and withdrawing the waste water which has been so contacted from the top portion of the container.

3. The method of claim 2 wherein the gas introduced from the bottom portion of the container together with the waste water is air.

4. The method of claim 2 wherein the gas introduced from the bottom of the container together with the waste water is ozone or a mixture of ozone and air.

5. The method of claim 1 wherein the ratio of the superficial volume occupied by the porous packed bed to the real volume of the porous packing pieces is adjusted to 1.5 to 100.

6. The method of claim 1 wherein a waste water having a COD of 10 to 100 ppm and an oil content of 2 to 50 ppm is introduced to obtain purified water having a COD of less than 10 ppm and an oil content of less than 1 ppm.

7. The method of claim 2 wherein the ratio of the superficial volume occupied by the porous packed bed to the real volume of the porous packing pieces is adjusted to 1.5 to 100.

8. The method of claim 2 wherein the waste water having a COD of 10 to 100 ppm and an oil content of 2 to 50 ppm is introduced to obtain purified water having a COD of less than 10 ppm and an oil content of less than 1 ppm.

9. The method of claim 1 wherein the upper level of the fluidized bed of the activated carbon particles is maintained at from 10 to 20 cm below the upper level of the porous packed bed.

10. The method of claim 2 wherein the upper level of the fluidized bed of the activated carbon particles is maintained at from 10 to 20 cm below the upper level of the porous packed bed.

* * * * *